United States Patent [19]
Kollin

[11] Patent Number: 4,853,769
[45] Date of Patent: Aug. 1, 1989

[54] TIME MULTIPLEXED AUTO-STEREOSCOPIC THREE-DIMENSIONAL IMAGING SYSTEM

[75] Inventor: Joel S. Kollin, Somerville, Mass.

[73] Assignee: Massachusetts Institute of Technology, Cambridge, Mass.

[21] Appl. No.: 62,904

[22] Filed: Jun. 16, 1987

[51] Int. Cl.[4] .......................................... H04N 13/00
[52] U.S. Cl. ...................................... 358/88; 358/90; 350/132; 350/143; 350/3.66
[58] Field of Search ...................... 358/88, 89, 90, 91, 358/92, 3, 903; 364/521, 522; 350/130–143, 3.6, 3.66, 3.82; 354/112, 114; 352/57–63; 367/8, 11, 13; 73/603, 606, 610, 609

[56] References Cited

U.S. PATENT DOCUMENTS

| | | | |
|---|---|---|---|
| 2,961,486 | 11/1960 | Marks | 358/88 |
| 3,097,261 | 7/1963 | Schipper et al. | |
| 3,140,415 | 7/1964 | Ketchpel | |
| 3,529,082 | 9/1970 | Hoesli | 358/92 |
| 3,674,332 | 7/1972 | Kogelnik | 350/3.66 |
| 3,829,838 | 8/1974 | Lewis et al. | 350/3.66 |
| 3,852,524 | 12/1974 | Ando et al. | 358/91 |
| 4,023,158 | 5/1977 | Corcoran | 358/88 X |
| 4,142,772 | 3/1979 | Lurie | 350/3.82 |
| 4,290,083 | 9/1988 | Collender | |
| 4,323,920 | 4/1982 | Collender | |
| 4,359,758 | 11/1982 | Teacherson | |
| 4,367,486 | 1/1983 | Eichenlaub | |
| 4,376,950 | 3/1983 | Brown et al. | |
| 4,415,996 | 11/1983 | Maynard et al. | 367/8 |
| 4,462,044 | 7/1984 | Thomason et al. | |
| 4,472,737 | 9/1984 | Iwasaki | 358/88 |
| 4,566,031 | 1/1986 | Kirk | 358/90 |
| 4,567,513 | 1/1986 | Imsand | |
| 4,584,604 | 4/1986 | Guichard et al. | |
| 4,607,255 | 8/1986 | Fuchs et al. | 358/89 X |
| 4,616,217 | 10/1986 | Nesbitt et al. | 358/88 X |
| 4,631,580 | 12/1986 | Taube et al. | 358/88 |
| 4,649,425 | 3/1987 | Pund | 358/88 |
| 4,671,632 | 6/1987 | August | 358/88 |

FOREIGN PATENT DOCUMENTS 2087291 5/1982 Japan ................................. 358/88

OTHER PUBLICATIONS

Tilton, Homer B., "The 3-D Oscilloscope," published by Prentice-Hall, Inc., Englewood, N.J. (1987).
Okoshi, T., *Three-Dimensional Imaging Techniques*, Academic Press, New York 1976, pp. 9–42, 124–185, 364–371.
Kollin, Joel S., "Collimated View Multiplexing: A New Approach to 3-D," *SPSE Three-Dimensional Imaging Conference*, Los Angeles, Jan. 1988 and SPIEV Proceedings, vol. 902, Jun. 1988.

*Primary Examiner*—Howard W. Britton
*Assistant Examiner*—Victor R. Kostak
*Attorney, Agent, or Firm*—Hamilton, Brook, Smith & Reynolds

[57] ABSTRACT

Light reflected from a three-dimensional scene is sequentially scanned according to its direction as it passes through a window. At any given time only light traveling in one direction can pass through the window to be recorded. These sequentially recorded collimated views can be recorded, altered, transmitted, and displayed as desired. The views are displayed through a synchronized directional scanner which sequentially displays the views through respective angles, providing a scene with parallax as well as depth. The directional scanner may be a louver structure or a device for steering a collimated display.

53 Claims, 6 Drawing Sheets

DIRECTION OF LIGHT

FIG. 6   60

DIRECTION OF LIGHT

TIME MULTIPLEXED AUTO-STEREOSCOPIC THREE-DIMENSIONAL IMAGING SYSTEM

BACKGROUND OF THE INVENTION

Conventional, full color three-dimensional video techniques usually involve the use of glasses. These systems work by alternating left and right eye views on a display such as a cathode ray tube (CRT). The images are separated by looking at them through two sets of filters so that, with interlaced video, the odd line scan corresponds with one eye's view and the even line scan corresponds with the other eye's view. One way of accomplishing the filtering is to put a fixed polarizer on the CRT and to look at the screen with active polarizer glasses. The polarizations of lenses of the glasses alternate out of phase with each other in synchronization with the vertical synch signal of the CRT. Thus, only one eye can see the CRT at one time. The other lens is cross-polarized to the screen polarizer so that nothing is seen with that eye. The same result can also be obtained by placing an alternating polarizer in front of the screen and fixed, perpendicular polarizers in the glasses. Glasses are not only unpleasant but restrict the viewer to a single stereo scene comprised of one view for each eye. A further drawback of such systems is that they are based on assumptions with respect to the viewer's visual system for their effect. A viewer with an unusual interocular distance, for example, would experience depth distortion with a conventional stereo pair.

Auto-stereoscopic systems avoid the requirement for glasses and thus some of the attendant drawbacks of glasses-dependent systems. An example is the holographic method. Holography reproduces both the phase and amplitude of the wavefront coming through a window defined by the hologram in order to exactly duplicate all of the light scattered from a scene and all of the depth information contained within that light. To paraphrase Emmett Leith, one of the fathers of holography, it is as if the light had "fallen asleep" on the hologram during its construction and "wakes up" when it is illuminated for display. Unfortunately, holograms of three dimensional objects must be made with strictly coherent illumination. Further, if the objects move more than a fraction of a wavelength during exposure, the fringes of the hologram are blurred out. These severe drawbacks have prevented holography's development as a mass medium. Also, the incredibly high spatial resolution of holograms on the order of 1,000 lines per millimeter has prevented their real-time electronic transmission.

Other available auto-stereoscopic media include integral photography and spatially multiplexed parallax barriers. While both of these utilize incoherent light, they have relatively strict limitations resulting from the optics involved. Conventional spatially multiplexed parallax barriers use wires or other means so that views are imaged at appropriate angles. Because all views must be presented simultaneously, the number of views is fairly limited. Also, the user must hold his head in a fixed position to see a correct orthoscopic view. Integral photography uses lenses to overcome this difficulty to some degree but introduces blurring, distortion and other problems. Furthermore, it has proven difficult to adapt such a system to electronic imaging because of alignment and imaging problems.

DISCLOSURE OF THE INVENTION

This invention relates to a method of representing a three-dimensional scene viewed through a window as a set of images, each of which is composed of light waves traveling in the same direction. These images can be read, stored and displayed sequentially. During display, a directional scanner directs collimated light carrying successive images in different directions such that each image is viewed from a different angle. A viewer who moves will see different views to create a sensation of parallax, and a sensation of depth is created by the presentation of a different view to each of the viewer's eyes.

Because only one view at a time is presented in the common field of the display screen, the entire field of the display screen can be used for each view for higher resolution. The full sweep of the directional scan and the corresponding sequence of images should take place fast enough so that the eye does not perceive flicker. The number of views presented is limited only by the bandwidth of the system. The external bandwidth of the system can be reduced by repeating views during the scanning cycle.

One directional scanner suitable for both a recording device and a display is a set of rotating louvers. In the case of the recording device, the louvers of sufficient aspect ratio and resolution limit the light received at any instant to that coming from a single viewing angle. In the display, louvers similarly limit the viewing angle. The louvers may be of fixed orientation relative to each other and be rotated about a common axis, or the louvers may be rotated about individual axes. A second set of louvers orthogonal to the first allows for both vertical and horizontal parallax and, in the camera, avoids the need for lenses, albeit with much higher bandwidth.

Directional scanners functionally equivalent to the louvers may be obtained by liquid crystal scanners or acousto-optic devices. Another form of scanner steers collimated images, thereby making more efficient use of available light. In one implementation, collimated light carrying an image is directed into a lenticular sheet. A second lenticular sheet moves transversely relative to the first to provide an angular scan of the collimated image. In another implementation, the collimated light is steered by a rotating reflector. In yet another implementation the scanner includes a pair of electro-optic prisms. Similar scanners may scan light from different directions through a fixed set of louvers in a recording device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

The present invention can be treated in a manner analogous to an analysis of holography. The mathematics of coherent optics have been set forth in Goodman, *Introduction to Fourier Optics*. Let U(x,y) represent the light reflected from a scene incident on an arbitrary X-Y plane, the plane of a window. Ignoring aperture effects, the two-dimensional Fourier transform of U can be represented by:

$$A(f_x, f_y) = \iint U(x,y) \exp[-j2\pi(f_x x + f_y y)] dx\, dy$$

By letting $$\alpha = \lambda f_x \quad \beta = \lambda f_y$$

the angular spectrum is:

$$A(f_x, f_y) = \iint U(x,y) \exp[-j2\pi(\alpha x/\lambda + \beta y/\lambda)] dx\, dy$$

where $\alpha$ and $\beta$ can be considered to be the direction cosines of plane waves impinging on the plane. In other words, any complex wavefront across an aperture can be represented as a combination of plane waves impinging from different angles to the aperture.

If a set of approximations to individual plane waves can be recorded and reproduced in a manner which is independent of wavelength, then an incoherent three-dimensional autostereoscopic imaging system is obtained. It is also desirable to record and reconstruct this angular spectrum in a manner which is compatible with existing media, especially broadcast media, and to do it quickly enough to incorporate motion (less than 1/60–1/30 of a second). Ideally, such a system also incorporates hardcopy capability and retains some compatibility with existing systems, including three-dimensional computer graphics technology.

Figure 1:
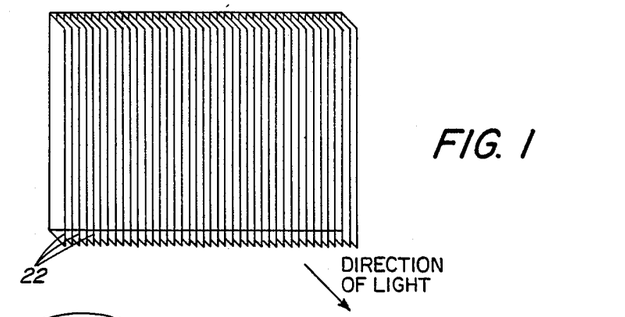
FIG. 1 is an illustration of a directional scanner comprising louvers used in one implementation of the invention.

One way to project the approximations to plane waves which can be considered to make up the full three-dimensional image is to sweep a rotating louver structure as illustrated in FIG. 1 in front of a conventional, high-speed display such as a CRT. Ideally, this structure would permit only collimated rays aligned with the louvers to pass into viewer space. An image corresponding to the angular view permitted by the louvers is rendered on the conventional display. The louvers are then rotated slightly, another image is displayed and so on until the louvers have reached their maximum angular position and are turned back to their original position. If every louver had room enough to rotate completely around its longitudinal center, there would be no need to reverse direction since continuous rotation would serve the same effect. More space between louvers, however, results in decreased angular selectivity, eventually leading to overlapping or ghost images.

The scanning process is repeated quickly enough so that the eye does not perceive flicker from the rotating louver structure, that is, about every 1/30 second or faster. Thus, where a conventional TV would project a single two-dimensional image every 1/30 second, for example, the present system projects a series of images, each image associated with a different directional position of the louvers, every 1/30 second. Together, that series of directionally projected images creates a three-dimensional display.

Figure 2:
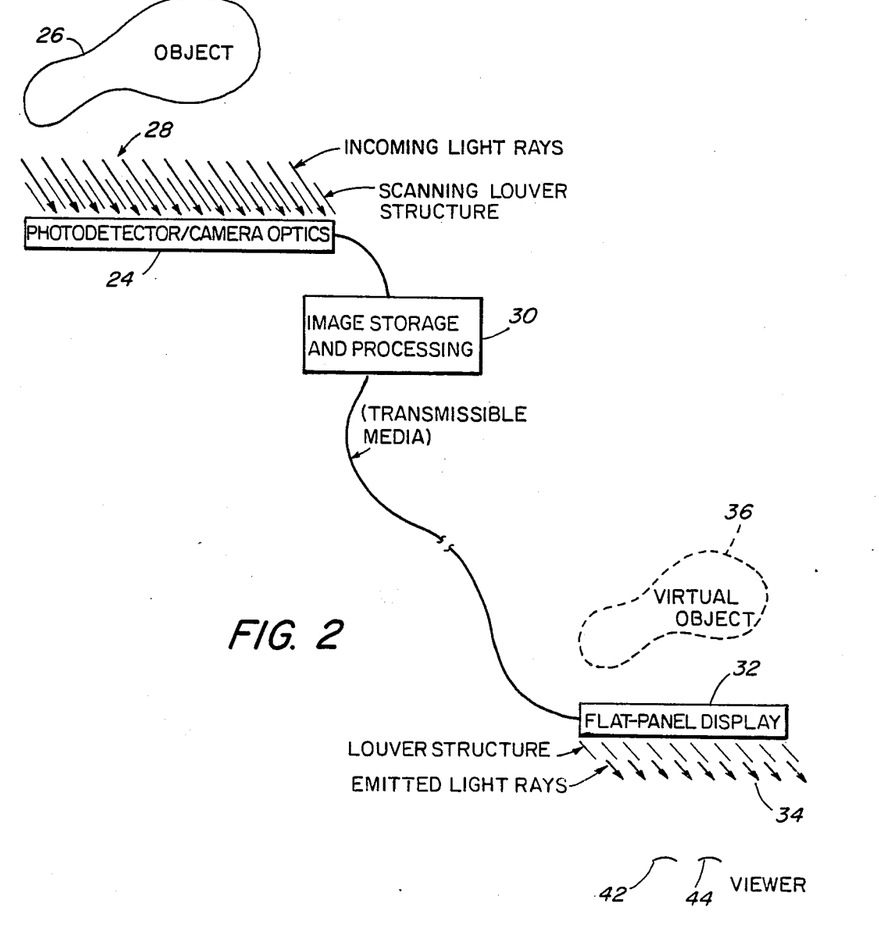
FIG. 2 is a schematic illustration of a camera and a display system utilizing the directional scanner of FIG. 1.

FIG. 2 illustrates the directional scanner of FIG. 1 in a recording and television system. A high-speed recording device 24 views any object 26 in an object field through a louver directional scanner 28. The view of the object in the object field, from a recording field of the recording device, is limited by the directional scanner. The recording device can be either a video or film camera, as long as a sufficient number of frames/second can be displayed. An electronic video signal may be stored and processed by a conventional data processor 30 prior to transmission to a display 32. The data processor can be used to extract and manipulate a three-dimensional model of the scene as desired. Differences between views can be exaggerated to increase the perceived depth of an object within a scene. Also, the location in depth of an object can be modified. Further, computer generated images may be interposed with images of the real object 26. In fact, electronically stored images may be totally computer generated and displayed without the use of recording device 24.

The display in this case is shown as a flat panel display but could well be, for example, a CRT or, in the case of film, a rear projection system. The display is projected through a directional scanner 34, and a viewer in front of the display perceives a three-dimensional virtual object 36.

Further understanding of the system of FIG. 2 can be obtained with reference to FIGS. 3A-3E which are plan views of rays projected from an object 26 to the eyes 42, 44 of the viewer. In these figures, each incremental image which is captured by the camera and then projected by the display is illustrated as being captured on a central field plane 38 within a window 40. The plane 38 corresponds to both the recording field of the camera photodetector and the display field of the display. The louvers 28 of the camera and 34 of the display are shown as continuous louvers in FIGS. 3. That continuity is functionally obtained by similarly synchronizing the louvers 28 and 34 to the images.

FIGS. 3A through 3E illustrate the capture and redisplay of five images at five angular positions of the directional scanner to illustrate the principles of the invention. However, it will be recognized that improved resolution is obtained by increasing the number of images with each scan of the directional scanner. It will also be recognized that all images are projected through a short scan time of, for example, 1/30 second such that the eyes perceive all images as being projected simultaneously.

It will be noted that, in the plane across the louvers, there is no requirement for a lens in the camera if the louvers sufficiently limit the light rays from the viewed object to those which are near parallel to the louvers and thus collimated. Thus, the photodetectors only view an approximation of a plane wave from the object 26. At any instant, rays in other directions from the object which would typically be focused by a lens are rejected by the louver structure. However, those rays are captured in a time multiplexed fashion as successive images recorded at successive positions of the scanner.

It can be seen from FIGS. 3A–3E that, if one were to view the display without the assistance of the directional scanner 34, one would perceive an image of the object moving quickly from one side of the window 40 to the other during the scan time of the louver 28. Movement would be so quick that the object would appear to be blurred. However, the directional scanner 34 limits the images and portions of the images viewed by the eyes 42 and 44 so that a steady three-dimensional image is perceived.

Figure 3A:
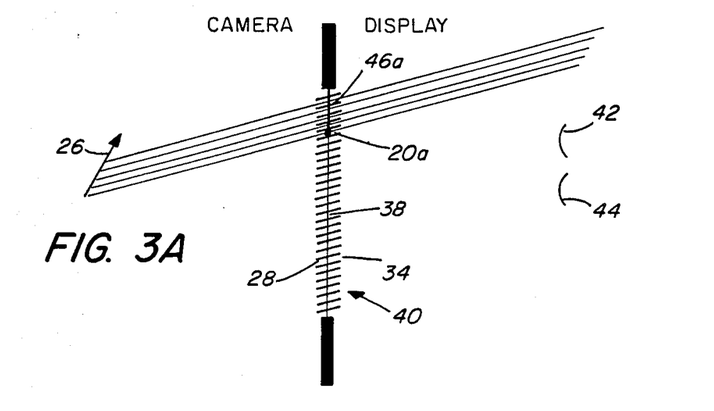
FIGS. 3A-3E illustrate the capture and display of five images at five positions of the directional scanner of the system of FIG. 2.
Figure 3B:
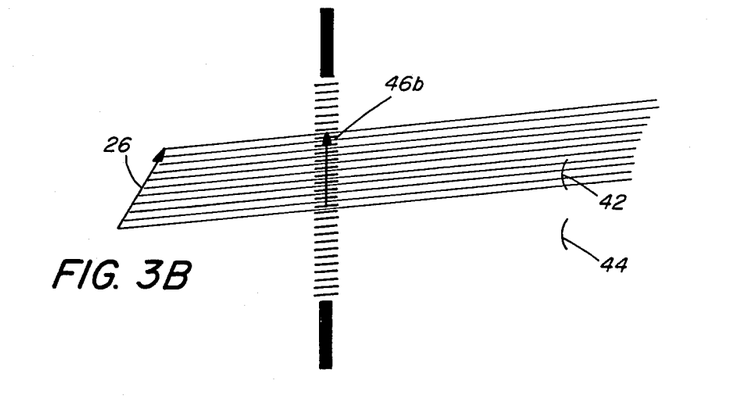
Figure 3C:
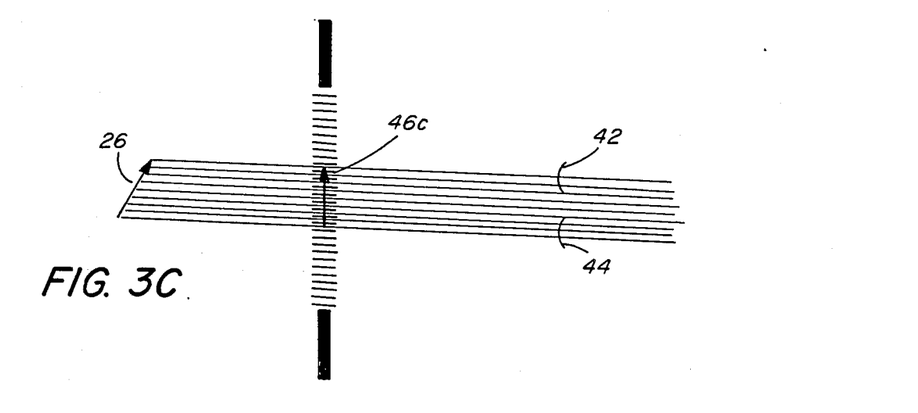
Figure 3D:
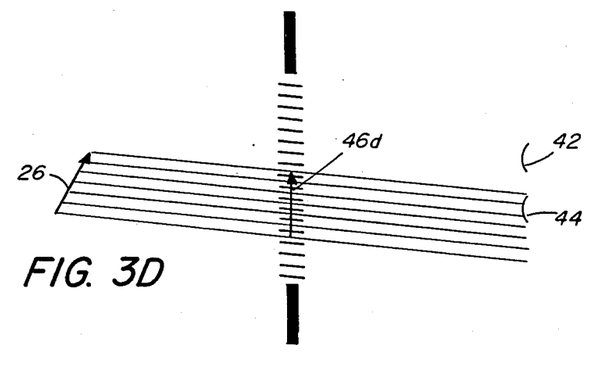
Figure 3E:
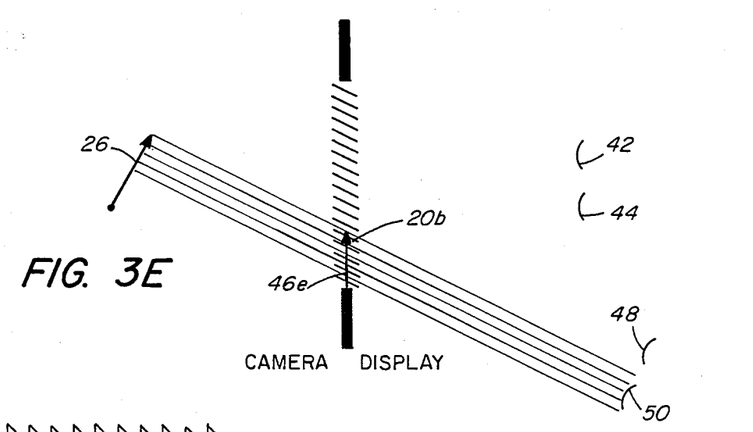

In the illustration of FIG. 3, none of the first image 46a is observed by either eye positioned as shown in FIG. 3A. In the directional and eye positions of FIG. 3B, only the eye 42 sees the image 46b and only a portion of the image is observed. In the positions of FIG. 3C, the eyes 42 and 44 observe different portions of the image 46c, and the portion observed by eye 44 is different from that portion observed in the position of FIG. 3B. Continuing through FIGS. 3D and 3E, the image is observed only by eye 44 and then by neither eye.

It can be seen from the sequence of FIGS. 3A through 3E that, through a full scan, each eye sees different portions of the object from different directions, and the two eyes see the same portions from different directions. Further, the eyes could be moved to, for example, the positions 48 and 50 in FIG. 3E and observe the object from other directions. It can also be seen that, with sufficient resolution obtained by a sufficient number of images recorded from a like number of directions, the sequentially reproduced collimated rays perceived by an eye together approach the light rays originally reflected from the scene. The collimated light rays are time multiplexed in the system rather than being projected simultaneously as in conventional vision.

Figure 4:
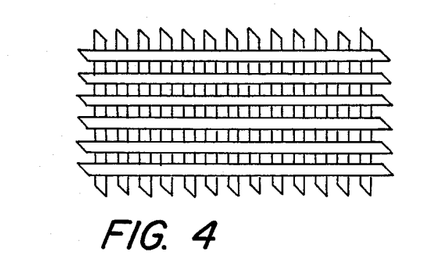
FIG. 4 illustrates a directional scanner comprised of orthogonal louver structures.

FIGS. 2 and 3 consider a single structure of vertical louvers. Such a system would require an anamorphic lens system in the camera to focus the images in the planes in line with the louvers. The system would also lack vertical parallax. While vertical parallax is not needed for perceived depth, it can be implemented by adding another, horizontally oriented louver system as illustrated in FIG. 4 or by using a functionally equivalent two-dimensional scanning structure. In any case, for every "vertical view" the system must scan through all of the horizontal ones or vice versa. Therefore, bandwidth is increased by a factor of $n_{vertical} \times n_{horizontal}$. A recording device with horizontal and vertical scanning needs only detectors, no lenses, to capture information with respect to the magnitude and direction of all light falling on it and, like a hologram, is therefore not limited in depth of field in the same manner as a conventional camera.

The system is now capable of coding the direction of light as well as its magnitude, while completely ignoring its phase and wavelength. Furthermore, while this can be accomplished without the aid of a computer, three-dimensional computer generated graphics can easily be incorporated into real 3-D scenes and displayed in real time. And by projecting the images sequentially in an optical "printer" it is possible to make synthetic holograms, making a self-contained hard-copy unit possible.

Figure 5:
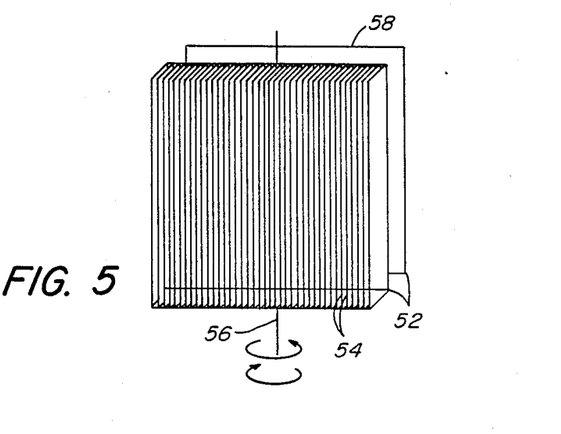
FIG. 5 illustrates a directional scanner comprising louvers which rotate about a common axis.

The additional hardware required to convert conventional high speed photodetectors and displays to three-dimensional recording devices and displays is the high speed angular modulator for passing sufficiently collimated waves from an object or image. Individually rotating louvers have been described, but other directional scanners may be used. The directional scanner of FIG. 5 utilizes a fixed louver element such as a light control film available under the trademark "3M." As illustrated in FIG. 5, the film 52 has within it a high resolution array of louvers 54 and is rotated about a single axis 56 in front of a display screen 58. Again, such a structure before a camera causes the camera to collect images resulting from individual approximations of plane waves and in front of the display projects individual plane waves. With limited collimation, such a system can be considered a time-multiplex, parallax barrier system.

Figure 6:
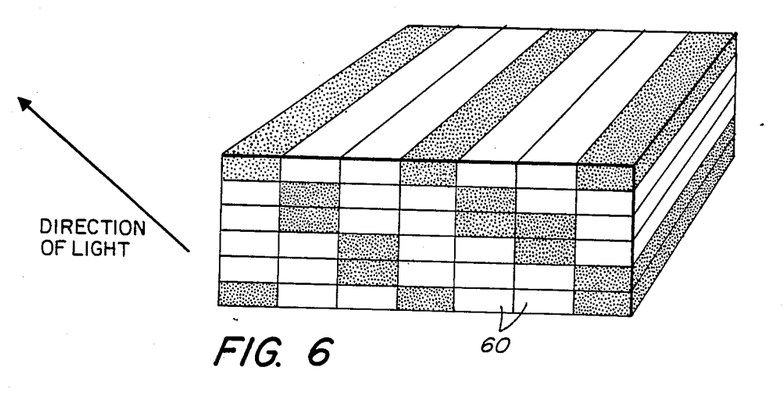
FIG. 6 illustrates an implementation of the directional scanner utilizing a liquid crystal matrix.

As illustrated in FIG. 6, louvers may be created by a stack of matrix-addressable transmission mode liquid crystal elements 60. The liquid crystals which are left opaque serve the function of the louvers in the prior embodiments. By properly addressing the liquid crystals, the effective louvers within the matrix can be caused to scan through various directions. It is also expected that a liquid crystal material will be developed which will deflect the light by rotating the molecules of the liquid crystal.

Figure 7:
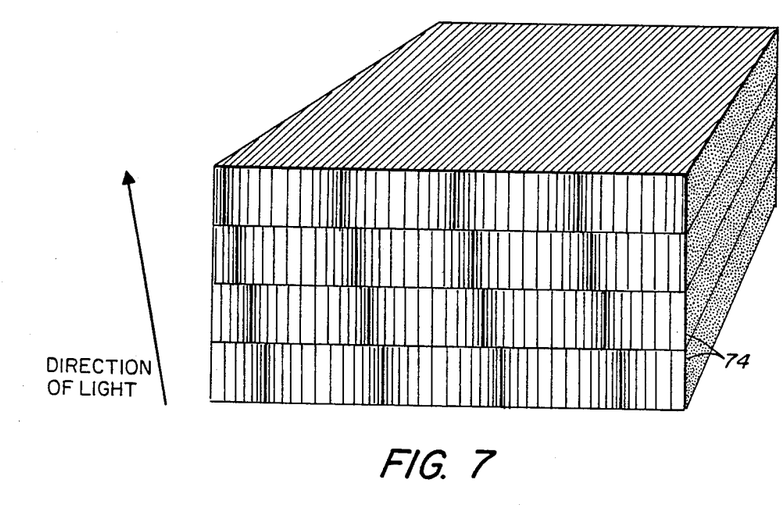
FIG. 7 illustrates an acousto-optic directional scanner.

A louver structure might also be obtained by an acousto-optic modulator as illustrated in FIG. 7. In this system, acoustic waves are transmitted along acoustic waveguide plates 74. Line spacing in FIG. 7 illustrates compression of acoustic waves transmitted through the plates. The refractive index of the waveguide material is proportional to that compression, and effective louvers are thus created for light transmitted across the stack of acousto-optic plates. An acousto-optic modulator might also be used in a diffraction mode for coherent light. Three coherent sources could make up the full spectrum of color.

Figure 8:
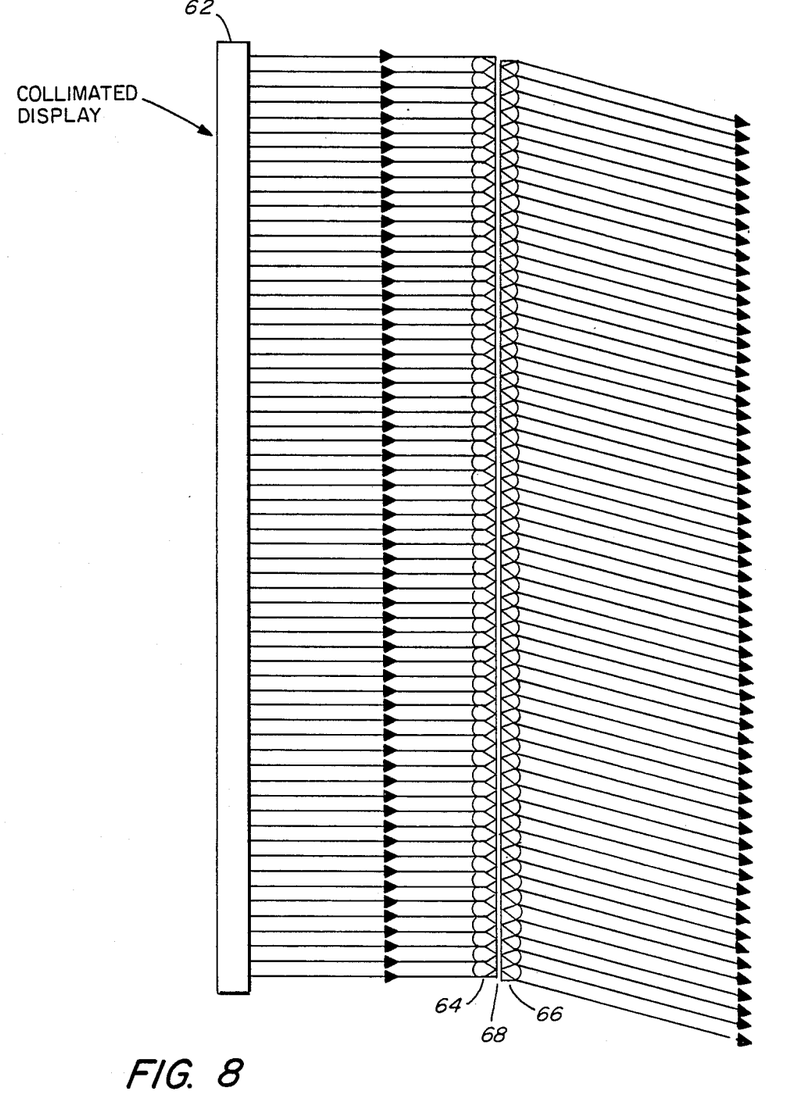
FIG. 8 is a directional scanner which utilizes a lenticular lens assembly.

FIG. 8 illustrates a system which is suitable for the directional scanner at the display but which does not utilize louvers. In this case, a collimated display initially generates the images. Such a display projects collimated light through a light valve matrix, thereby modulating it with the image. The collimated image is then steered through a range of angles. In the system of FIG. 8, that steering is obtained by two sheets 64 and 66 of cylindrical lenticular lenses. Each lens film has a focal plane at the interface 68 between the films. By then sliding the film 66 transverse to the optic axis of the system, the collimated image received by the lens film 64 is transmitted through an angular scan by the lens film 66. Because no light is lost after the generation of the collimated image, this scanning is more efficient than that of the louver structure. Note that this system can use the full spatial resolution of the screen at any time.

Figure 9:
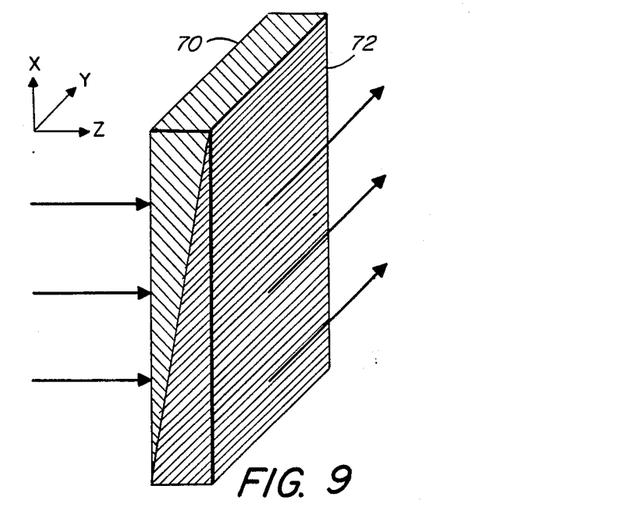
FIG. 9 illustrates a directional scanner utilizing an electro-optic modulator.

Another device for steering a collimated display is illustrated in FIG. 9. The scanner comprises prisms 70 and 72 which have the same crystal orientation except that their y axes are reversed with respect to each other. An electric field is applied along the y direction. The system deflects light along the z axis due to a graded optical path difference caused by the electro-optic effect. A detailed analysis of such a device can be found in Yariv, *Introduction to Optical Electronics,* page 244. Such devices may be laminated for increased deflection.

Figure 10:
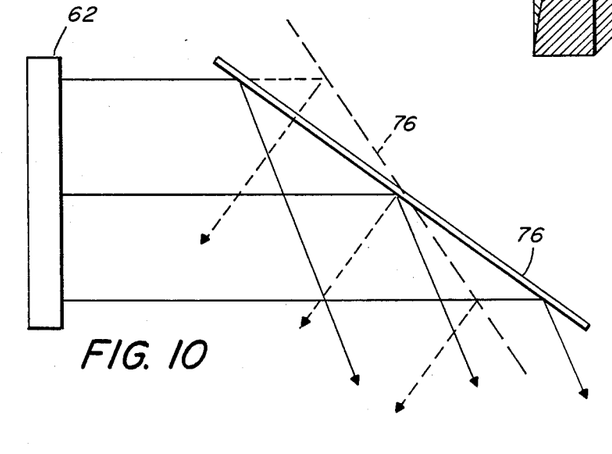
FIG. 10 illustrates a directional scanner utilizing a rotating reflector.

Yet another system for steering a collimated display is illustrated in FIG. 10. In this system, the collimated display is reflected from a rotating mirror 76.

Figure 11:
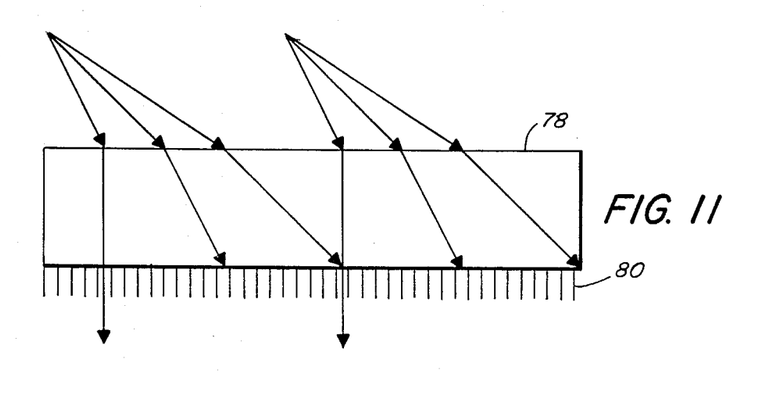
FIG. 11 illustrates the use of a directional scanner before a set of fixed louvers in a recording device.

Each of the scanners described above can be used in both the recording and display ends of the system. The devices of FIGS. 8, 9 and 10, which steer collimated images in the display, can be incorporated into a recording device using the configuration of FIG. 11. In FIG. 11, the scanner 78, which may be any of the scanners described above, is positioned in front of a set of fixed louvers 80. At a given point in time, the scanner bends light incident at a particular angle so that the light is parallel to the louver structure and can therefore be collimated and recorded. The scanner then causes light incident at a slightly different angle to be refracted such that it is parallel to the louvers and recorded. A full sequence of images with a full scan can be recorded as discussed above.

While this invention has been particularly shown and described with references to preferred embodiments thereof, it will be understood by those skilled in the art that various changes in form and details may be made therein without departing from the spirit and scope of the invention as defined by the appended claims.

I claim:

1. Display apparatus for presenting a three-dimensional display to a viewer comprising:
    an image generator for generating a sequence of images in a common display field to be viewed by a viewer; and
    a directional scanner between the display field and viewer for directing collimated light from the images in the common display field such that successive images are viewed from different angles, the images being generated and the collimated light being scanned at a sufficient rate to create a perception by the viewer of a single three-dimensional view through the common display field.

2. Display apparatus as claimed in claim 1 wherein the directional scanner comprises liquid crystals.

3. Display apparatus as claimed in claim 1 wherein the directional scanner comprises an electro-optic modulator.

4. Display apparatus as claimed in claim 1 wherein the directional scanner is an acousto-optic device.

5. Display apparatus as claimed in claim 1 wherein the image generator generates a sequence of collimated images.

6. Display apparatus as claimed in claim 5 wherein the directional scanner comprises an electro-optic device.

7. Display apparatus as claimed in claim 5 wherein the directional scanner is a scanning reflector.

8. Display apparatus for presenting a three-dimensional display comprising:
    an image generator for generating a sequence of images in a common field; and
    a directional scanner for directing collimated light from the images in the common field such that successive images are viewed from different angles, the images being generated and the collimated light being scanned at a sufficient rate to create a perception of a single three-dimensional view through the common field, the directional scanner comprising a plurality of louvers.

9. Display apparatus as claimed in claim 8 wherein the louvers are of fixed orientation relative to each other and are rotated about a common axis.

10. Display apparatus as claimed in claim 8 wherein the louvers are rotated about individual axes.

11. Display apparatus as claimed in claim 8 further comprising a second set of louvers orthogonal to the first to provide vertical and horizontal parallax.

12. Display apparatus for presenting a three-dimensional display comprising:
    an image generator for generating a sequence of collimated images in a common field; and
    a directional scanner for directing collimated light from the images in the common field such that successive images are viewed from different angles, the images being generated and the collimated light being scanned at a sufficient rate to create a perception of a single three-dimensional view through the common field, and wherein the directional scanner comprises a first lenticular lens sheet which receives collimated light from the image generator and focuses that light on a focal plane and a second lenticular lens sheet having a focal plane in common with the focal plane of the first sheet, the first and second sheets being axially translatable relative to each other to directionally scan the collimated light from the image generator.

13. Display apparatus for presenting a three-dimensional display comprising:
    a viewing window;
    view limiting means for limiting the viewing direction from which the viewing window may be viewed and for changing the viewing direction; and
    imaging means for generating successive images in a common field at the viewing window with changes in the viewing direction such that a binocular viewer may view a different image from the viewing window with each eye to perceive a three-dimensional scene.

14. Display apparatus for presenting a three-dimensional display comprising:
    a viewing window;
    view limiting means for limiting the direction from which the viewing window may be viewed and for scanning through a range of viewing directions; and
    imaging means for generating successive images in a common field at the viewing window through each of plural scans of the view limiting means such that binocular viewers viewing from any of plural directions may perceive different three-dimensional images from the viewing window.

15. Display apparatus as claimed in claim 14 wherein the view limiting means comprises a plurality of louvers.

16. Display apparatus as claimed in claim 14 wherein the imaging means generates collimated images.

17. Display apparatus for presenting a three-dimensional display to a viewer comprising:
    an image generator for generating a sequence of images in collimated light from a common display field to be viewed by a viewer; and
    a directional scanner between the display field and viewer for steering collimated images through a range of directions such that successive images from the common display field are viewed by the viewer from different angles.

18. Display apparatus for presenting a three-dimensional display comprising:
an image generator for generating a sequence of images in collimated light from a common field; and
a directional scanner for steering collimated images through a range of directions such that successive images from the common field are viewed from different angles, wherein the directional scanner comprises a first lenticular lens sheet which receives collimated light from the image generator and focuses that light on a focal plane and a second lenticular lens sheet having a focal plane in common with the focal plane of the first sheet, the first and second sheets being translatable relative each other to directionally scan the collimated light from the image generator.

19. Display apparatus as claimed in claim 17 wherein the directional scanner comprises an electro-optic device.

20. Display apparatus as claimed in claim 17 wherein the directional scanner is a scanning reflector.

21. A method of providing a three-dimensional display, the method comprising generating successive images in a common field at a viewing window while simultaneously changing the direction from which the viewing window may be viewed such that a binocular viewer may view different images from the common field with different eyes to perceive a three-dimensional image.

22. A method as claimed in claim 21 wherein the step of changing direction from which the viewing window may be viewed comprises rotating louvers.

23. A method as claimed in claim 21 comprising generating collimated images in the step of generating successive images.

24. A method as claimed in claim 23 wherein the step of changing the direction from which the viewing window may be viewed comprises translating a pair of lenticular lens sheets relative to each other.

25. A method as claimed in claim 23 comprising electro-optically changing the direction from which the viewing window may be viewed.

26. A method as claimed in claim 23 wherein the step of changing the direction from which the viewing window may be viewed comprises scanning a reflector.

27. A method as claimed in claim 21 further comprising providing a different set of images with each scan to provide a motion picture three-dimensional display.

28. A device for recording successive images of an object field to be displayed as a three-dimensional image, the device comprising an image recorder for recording successive images presented in a common recording field, view limiting means between the object field and the recording field for limiting the viewing direction of the recorder from the common recording field in viewing the object field, and means for scanning the view limiting means through plural directions as successive images are recorded from the common recording field.

29. A device for recording successive images to be displayed as a three-dimensional image, the device comprising view limiting means for limiting the viewing direction of the device and means for scanning the view limiting means through plural directions as successive images are recorded in a common field, the view limiting means comprising louvers.

30. A device as claimed in claim 29 wherein the view limiting means comprises orthogonal sets of louvers for horizontal and vertical parallax.

31. A device for recording successive images to be displayed as a three-dimensional image, the device comprising view limiting means for limiting the viewing direction of the device and means for scanning the view limiting means through plural directions as successive images are recorded in a common field, the means for scanning comprising liquid crystals.

32. A device as claimed in claim 28 wherein the means for scanning comprises an electro-optic modulator.

33. A device as claimed in claim 28 wherein the means for scanning comprises an acousto-optic device.

34. A device for recording successive images to be displayed as a three-dimensional image, the device comprising view limiting means for limiting the viewing direction of the device and means for scanning the view limiting means through plural directions as successive images are recorded in a common field, the means for limiting the viewing direction comprising a set of fixed louvers positioned behind the means for scanning.

35. A device as claimed in claim 34 wherein the means for scanning comprises a first lenticular lens sheet which receives collimated light from the image generator and focuses that light on a focal plane and a second lenticular lens sheet having a focal plane in common wit the focal plane of the first sheet, the first and second sheets being axially translatable relative to each other to directionally scan the collimated light from the image generator.

36. A device as claimed in claim 34 wherein the means for scanning comprises an electro-optic device.

37. A device as claimed in claim 34 wherein the means for scanning is a scanning reflector.

38. A method of recording a set of images for a three-dimensional display comprising limiting the viewing direction of a recording device from a recording field to an object field and scanning through plural limited viewing directions from the recording field to the object field while recording successive images from different respective directions.

39. A method of recording a set of images for a three-dimensional display comprising limiting the viewing direction of a recording device and scanning through plural limited directions while recording successive images from different respective directions, the method comprising limiting the view by louvers.

40. A method of recording a set of images for a three-dimensional display comprising limiting the viewing direction of a recording device and scanning through plural limited directions while recording successive images from different respective directions, the method comprising limiting the view by a set of fixed louvers.

41. A method as claimed in claim 40 wherein the step of scanning comprises translating first and second lenticular lens sheets, having a common focal plane, relative to each other.

42. A method as claimed in claim 40 comprising electro-optically scanning through plural limited directions 43. A method as claimed in claim 40 wherein the step of scanning comprises scanning a reflector.

44. A method of creating a three-dimensional display comprising optically multiplexing in time a plurality of images from a common display field as approximate plane waves traveling in different respective directions.

45. A method of creating a three-dimensional display comprising generating a plurality of electronically stored images to be displayed in a common display field and optically multiplexed in time as approximate plane waves traveling in different respective directions and electronically processing the electronically stored images to modify a three-dimensional scene displayed in the common display field to be perceived by a viewer viewing the multiplexed plane waves.

46. A method as claimed in claim 45 wherein the step of electronically processing the electronically stored images comprises changing the perceived depth of an object in the scene.

47. A method as claimed in claim 45 wherein the step of electronically processing the electronically stored images comprises changing the perceived relative position of an object in the scene.

48. A method as claimed in claim 45 wherein the step of electronically processing the electronically stored images comprises interposing computer generated images with images generated from a real scene.

49. Display apparatus for presenting a three-dimensional display comprising:

an image generator for generating a sequence of image; and a directional scanner comprising a plurality of rotating louvers for directing collimated light from the images such that successive images are viewed from different angles.

50. Display apparatus as claimed in claim 49 wherein the louvers are of a fixed orientation relative to each other and are rotated about a common axis.

51. Display apparatus as claimed in claim 49 wherein the louvers are rotated about individual axes.

52. Display apparatus for presenting a three-dimensional display comprising:

an image generator for generating a sequence of images; and a directional scanner for directing collimated light from the images such that successive images are viewed from different angles, the scanner comprising first and second sets of orthogonal louvers which provide vertical and horizontal parallax.

53. A method of providing a three-dimensional display, the method comprising generating successive images at a viewing window while simultaneously rotating louvers to change the direction from which the viewing window may be viewed such that a binocular viewer may view different images with different eyes to perceive a three-dimensional image.

* * * * *